United States Patent [19]

Humplík et al.

[11] Patent Number: 4,983,657

[45] Date of Patent: Jan. 8, 1991

[54] SYNERGISTIC MIXTURE FOR POLYOLEFIN STABILIZATION

[75] Inventors: Antonín Humplík; Mária Bencková; Pavol Čaučík; Július Durmis; Marcela Göghová; Milan Karvaš; Ivo Orlík; Marta Považancová, all of Bratislava, Czechoslovakia

[73] Assignee: Výskumný ústav chemickej technológie výskumná a vývojova organizácia, Bratislava, Czechoslovakia

[21] Appl. No.: 359,775

[22] Filed: May 31, 1989

[30] Foreign Application Priority Data

May 31, 1988 [CS] Czechoslovakia ............... 3718-88

[51] Int. Cl.$^5$ .................. C08K 5/526; C09K 15/32
[52] U.S. Cl. ........................... 524/120; 524/350; 252/400.24
[58] Field of Search ............ 252/400.24; 524/120, 524/350

[56] References Cited

U.S. PATENT DOCUMENTS 4,443,572  4/1984  Burns ................... 524/120

OTHER PUBLICATIONS

Chemical Abstracts, vol. 107:177166n, 1987, p. 46.

Primary Examiner—Kriellion Morgan

[57] ABSTRACT

A stabilizer composition for polymer materials, especially for polyolefines, based on a combination of alkylated aralkylphenol and bis-[aralkylphenyl] pentaerythritol-diphospite.

14 Claims, No Drawings

SYNERGISTIC MIXTURE FOR POLYOLEFIN STABILIZATION

BACKGROUND OF THE INVENTION

This invention relates to a stabilizer composition for polymer materials, particularly for polyolefines. The stabilizer composition comprises alkylated aralkylphenol and bis (aralkylphenyl) pentaerythritoldiphosphite.

The need for protection of polymer materials against thermooxidation degradation during their processing, storage and utilization has been increasing due to various factors. More particularly the mechanical and thermal strain, UV radiation, air oxygen and the like, cause the scission of polymer chains and the subsequent oxidation of fragements thus formed. Moreover, upon melting, a change of physico-mechanical properties of the polymer material results.

It is presently known that sterically hindered phenols and phosphites are generally employed as stabilizers for polyolefins. Among the known phenols, 2,6-di-tert-butyl-4-methylphenol and 2-tert.-butyl-4-(alpha-dimethylbenzyl) phenol (CS 235 169) show high efficiency during the processing of the polymer, but they are relatively volatile at higher processing temperatures, and thus the efficiency during utilization decreases. High-molecular phenolic antioxidants, at the same level of dosage are less efficient. Both groups can result in the undesirable coloring of the polymer.

Phosphite stabilizers offer relatively good processing stability and thermooxidation stability. However, they are subject to considerable hydrolyzation and problems associated with it during storage and processing with the result that their use is less advantageous. Low-molecular type phosphites are liquid which result in yellowing during their service. Higher-molecular pentaerythritol phosphites described in CS 191 331 and CS 211 116, eliminate these deficiencies but increase the cost for the stabilization system.

It is a well known fact that in some cases during the combination of various types of stabilizers there is a mutual interaction of respective components of such a stabilization system. Accordingly, a great deal of research is directed to the synergistic effect as the basis for the decrease of the cost for the stabilization and extension of the service life of goods made of plastics during their utilization. In U.S. Pat. No. 3,535,249 there is described the antioxidation mixture comprising the phenolic antioxidant, deactivator of the action of heavy metals and reduction agent, for polyolefines. Vulcanizates made of unsaturated rubbers can be protected by the synergistic combination of 2-mercaptobenzimidazole with the phenolic or amine antioxidant (CS 165 480, CS 244 977).

There are well known multi-component systems based on phenolic and phosphite antioxidants conceivably with other co-stabilizers. For example, the GB Patent No. 1,526,603 is drawn to the process of the preparation and application of bis (dialkylphenyl) pentaerythritoldiphosphite together with phenolic antioxidants. Other patents, JP No. 0 250 031, JP No. 155 486, JP No.255 229, CS No. 190 837 and EP No. 184 191 are drawn to multi-compositional systems, comprising phenolic and phosphite stabilizers.

SUMMARY OF THE INVENTION

The object of the present invention is to provide a significant improvement of the stabilization system compared with present systems. This and other objects of this invention will become apparent to one skilled in the art from the following detailed description and the appended claims.

In accordance with the present invention, we have discovered that a stabilizer composition for polymer materials based on alkylated aralkylphenol and bis (aralkylphenyl) pentaerythritoldiphosphite provide greatly improved stabilization of the polymer materials.

DESCRIPTION OF THE INVENTION

The stabilizer composition of the present invention comprises 0.5 to 50 weight percent of 2-tert-butyl-4-(alpha, alpha'-dimethylbenzyl) phenol and 99.5 to 50 weight per cent of bis (2-tertiary butyl-4-[alpha,alpha'-dimethylbenzyl] phenyl) pentaerythritol-diphosphite. The stabilizer composition is added into the polymer substrate in an amount of from 0.01 to 1.0 weight percent and preferably from 0.5 weight percent with respect to the basic polymers, which are polyolefines.

By the combination of the stabilizers mentioned herein, a considerably higher efficiency of stabilization results than that obtained with the use of each component separately. The stabilizer composition according to this invention ensures not only high stability of polymer materials during their processing and utilization, but there is also significantly lower volatility and hydrolyzation as compared with commonly used stabilizers, and in addition, effective protection against the coloring of the polymer.

The stabilization effect of the composition according to this invention suppresses stabilization effects of other stabilizers based on pentaerythritol at the same amount. The components of the composition are nontoxic, their production utilizes easily available raw materials obtained by the reprocessing of technological wastes.

In accordance with this invention the composition can be applied into the polymer substrate as separate components in the corresponding proportion or as a mixture, prepared by first mixing the components in the corresponding proportion. The stabilizer composition of this invention can be applied as a separate composition or in combination with other stabilization additives, such as antioxidants, light stabilizers, pigments, fillers, flame retarders and the like.

According to the invention the stabilizer composition can be added into the polymer directly or at the production of the polymer or its processing using common processing methods. The polymer stabilized by the composition according to this invention can be processed by extrusion, injection molding, rolling, molding, blow forming and the like, to such products as fibres, sheets, tapes, panels, pipes, covers on suitable basic substrate and the like.

The following examples illustrate but do not limit the present invention.

EXAMPLE 1

Stabilization compositions were prepared from 2-tert-butyl-4-(alpha, alpha'-dimethylbenzyl) phenol (A) and bis (2-tert-butyl-4-(alpha, alpha'-dimethylbenzylphenyl)) pentaerythritoldiphosphite (B) according to Table 1.

TABLE 1

| Stabilizer | 1 | 2 | 3 | 4 | 5 |
|---|---|---|---|---|---|
| Component A, weight percent | 100 | 75 | 50 | 25 | 0 |
| Component B, weight percent | 0 | 25 | 50 | 75 | 100 |

From polypropylene powder (melt flow index 8 g/10 min. at the temperature of 230° C., the content of the isotactic proportion 92.2 weight percent) there were prepared mixtures containing the stabilizer composition in the amount of 0.1 weight percent relative to the polymer, and containing additional 0.1 weight percent of calcium stearate. Mixtures were prepared on the planetary mixer of Plasticorder Brabender PLE 331. The stability of mixtures prepared in this way and the stabilization efficiency of compositions was measured by changes of the melt flow index [MFI] at the temperature of 230° C. after the multiple extrusion on the extruder of Plasticorder Brabender PLE 331, D=19 mm, L/D=25 and at temperatures 230° C./250° C./260° C. at 300 r.p.m. The change of the color of the polymer after extrusion was measured for sheets with the thickness of 0.5 mm, prepared by molding at the temperature of 260° C. for 5 minutes, after the preceding homogenization in the nitrogen atmosphere at the temperature of 180° C. for 5 minutes on Leukometer Zeiss Jena by values of the reflection coefficient, $R_{FM}$, $\lambda_{max}=459$ nm and the blue filter. Values of the melt flow index [MFI] (g/10 min), measured at the temperature of 230° C. and values of $R_{RM}$ are summarized in Table 2.

TABLE 2

| Stabilizer Composition | Number of Transitions | | | |
|---|---|---|---|---|
| | 1 | | 5 | |
| | MFI | $R_{FM}$ | MFI | $R_{FM}$ |
| — | 21.2 | 77.0 | 53.2 | 74.2 |
| 1 | 14.2 | 77.2 | 25.2 | 76.5 |
| 2 | 11.3 | | 16.2 | |
| 3 | 10.2 | 78.7 | 14.6 | 78.0 |
| 4 | 9.6 | | 12.8 | |
| 5 | 10.5 | 77.4 | 14.9 | 77.2 |

From the data of Table 2, the synergistic effect of the stabilizer composition in question began to manifest at the ratio of components 1:1, while it manifests most significantly at the ratio of 1:3.

EXAMPLE 2

The polypropylene powder (the melt flow index 10.4 g/min, at the temperature of 230° C.), stabilized by 0.25 weight percent of the stabilizer under investigation and containing 0.1 weight percent of calcium stearate, was exposed to thermooxidation degradation in the measuring mixer W50H Plasticorder brabender PLE 331 at the temperature of 180° C. in the presence of the air at 50 r.p.m. There was measured the time of the decrease of the relative viscosity of the polymer to its half value, $\tau/2$, min. Results obtained are summarized in Table 3.

TABLE 3

| Stabilizer system | $\tau/2$, min. |
|---|---|
| — | 22 |
| Stabilizer A | 186 |
| Stabilizer B | 230 |
| Stabilizer Composition A + B, ratio 1:1 | 360 |
| Bis (2,4-ditert-butylphenyl)-pentaerythritoldiphosphite | 223 |

EXAMPLE 3

The polypropylene copolymer was mixed with 0.05 weight percent of the stabilizer under investigation and 0.1 weight percent of calcium stearate in the Hobert mixer at 60 r.p.m. for 15 minutes. The stability of the polymer was measured by changes of the melt flow index at 230° C. and with the weight of 2.16 kg after multiple extrusion on the extruder of Plasticorder Brabender PLV 340, D=19 mm, L=25 D, 150 r.p.m. and temperatures 230° C./240° C./250° C./260° C. The found values of the melt flow index [MFI] (g/10 min) are set out in Table 4.

TABLE 4

| Stabilizer system | MFI after | |
|---|---|---|
| | 1st transition | 5th transition |
| — | 3.9 | 9.8 |
| pentaerythritol-tetrakis-3 (3,5-ditert-butyl-4-hydroxyphenyl) propionate | 3.0 | 5.5 |
| Stabilizer A | 2.8 | 5.3 |
| Stabilizer B | 2.3 | 4.1 |
| Stabilizer composition, ratio 1:2 | 1.7 | 2.3 |

EXAMPLE 4

Into the unstabilized high-pressure polyethylene (MFI=0.3 g/10 min, density 0.923 g/cm$^3$), there was added 0.2 weight percent of the stabilizer under investigation on the measuring mixer W 50 H Plasticorder Brabender PLE 331 at the temperature of 180° C. and 45 r.p.m. The thermal stability of the system was measured by the time which is needed for the decrease of the relative viscosity of the melt to the half of the original value, $\tau/2$, min. Results obtained are set out in Table 5.

TABLE 5

| Stabilizer System | $\tau/2$, min |
|---|---|
| — | 12 |
| Stabilizer A | 103 |
| Stabilizer B | 187 |
| Stabilizer composition A + B, ratio 1:3 | 262 |
| Distearylpentaerylthritoldiphopsphite | 155 |

EXAMPLE 5

The linear low-density polyethylene [MFI-1.4 g/10 min, density 0.919 g/cm$^3$] containing 0.2 weight percent of the stabilizer under investigation was degraded in the measuring mixer W 50H Plasticorder Brabender PLE 331 at the temperature of 200° C. and 50 r.p.m. in the presence of air. The stability of the system was measured by the decrease of the relative viscocity of the melt to its half value, $\tau/2$, min. Results obtained are summarized in Table 6.

TABLE 6

| Stabilizer System | $\tau/2$, min |
|---|---|
| — | 60 |
| Stabilizer A | 80 |
| Stabilizer B | 109 |
| Stabilizer composition A + B, ratio 1:1 | 130 |
| Stabilizer composition A + B, ratio 1:19 | 114 |
| Bis(2,4-ditert-butylphenyl)-pentaerythritoldisphosphite | 110 |

EXAMPLE 6

Into the low-pressure high-density polyethylene [MF=6 g/min, density 0.962 g/cm$^3$], under the same conditions as in Example 5, there were mixed stabilizers under investigation in the amount of 0.05 weight percent and there was measured the time of the decrease of the relative viscosity of the melt of the polymer to its half value, $\tau/2$, min. Results obtained are set out in Table 7.

TABLE 7

| Stabilizer system | $\tau/2$, min |
|---|---|
| — | 44 |
| Stabilizer A | 55 |
| Stabilizer B | 115 |
| Stabilizer composition, A + B, ratio 1:1 | 260 |

EXAMPLE 7

Into the high-molecular polyethylene (MFI=0.14 g/10 min, density 0.939 g/cm$^3$) there were mixed separate stabilizers under investigation in the amount of 0.1 weight percent on the planetary mixer at the laboratory temperature. The mixtures were exposed to strain using multiple repeated transitions through the extruder of the laboratory extruder of CAMIL D=25 mm, L=20 D, 50 r.p.m. at temperatures 200° C./260° C./250° C. Values of MFI (g/10 min), measured on the extrusion plastometer VP 05 at the temperature of 190° C. and with the weight of 43.03N are summarized in Table 8.

TABLE 8

| | MFI after | |
|---|---|---|
| Stabilizer system | 1st transition | 10th transition |
| — | 0.22 | 0.30 |
| Stabilizer A | 0.16 | 0.25 |
| Stabilizer B | 0.12 | 0.15 |
| Stabilizer Composition, A + B, ratio 1:1 | 0.10 | 0.12 |

We claim:

1. A stabilizer composition for polymers comprising an alkylated aralkylphenol in an amount from about 0.5 to 50 weight percent and a bis (aralkylphenyl) pentaerythritoldiphosphite in an amount from about 99.5 to 50 weight percent.

2. A stabilizer composition in accordance with claim 1, wherein the phenol compound is 2-tertiary butyl-4-(alpha, alpha'-dimethylbenzyl) phenol.

3. A stabilizer composition in accordance with claim 1, wherein the phosphite compound is bis (2-tertiary butyl-4 [alpha, alpha'-dimethylbenzyl] phenyl) pentaerythritol-diphosphite.

4. A stabilizer composition in accordance with claim 1, wherein said phenol compound is 2-tertiary butyl-4-(alpha, alpha'-dimethylbenzyl) phenol and said phosphite compound is bis (2-tertiary butyl-4-[alpha, alpha'-dimethylbenzyl] phenyl)-pentaerythritoldiphosphite.

5. A polymer composition of at least one polymer of an olefin having therein a stabilizer composition comprising from about 0.01 to 1.0 weight percent relative to the polymer of a stabilizer composition according to claim 1.

6. A polymer composition according to claim 5, having therein a stabilizer composition comprising from about 0.05 to 0.5 weight percent relative to the polymer of a stabilizer composition according to claim 1.

7. A polymer composition according to claim 5, wherein said phenol compound is 2-tertiary butyl-4-(alpha, alpha'-dimethylbenzyl) phenol.

8. A polymer composition according to claim 5, wherein said phosphite compound is bis-(2-tertiary butyl-4 [alpha, alpha'-dimethylbenzyl] phenyl) pentaerythritoldiphosphite.

9. A polymer composition according to claim 5, wherein the phenol compound is 2-tertiary butyl-4-(alpha, alpha'-dimethylbenzyl) phenol and the phosphite compound is bis (2-tertiary butyl-4-[alpha, alpha'-dimethylbenzyl] phenyl) pentaerythritoldiphosphite.

10. A polymer composition according to claim 6, wherein said phenol compound is 2-tertiary butyl-4-(alpha, alpha'-dimethylbenzyl) phenol.

11. A polymer composition according to claim 6, wherein said phosphite compound is bis(2-tetiary butyl-4-[alpha, alpha'-dimethylenzyl] phenyl) pentaerythritoldiphospite.

12. A polymer composition according to claim 6, wherein the stabilizer composition comprises 2-tertiary butyl-4-(alpha, alpha'-dimethylbenzyl) phenol and bis(2-tertiary butyl-4[alpha, alpha'dimethylbenzyl] phenyl)-pentaerythritoldiphosphite.

13. A stabilizer system composition according to claim 1 in which binary combination the phenol compound is 2alkyl-4-aralkyl phenol.

14. A stabilizer system composition according to claim 13 in which the stabilizer combination results in a substantially higher efficiency of stabilization of polymers tha that obtained with the use of the same amount of each phenol and phosphite component separately.

* * * * *